(No Model.)
I. A. KERR.
VENTILATED BARREL.
No. 354,706. Patented Dec. 21, 1886.
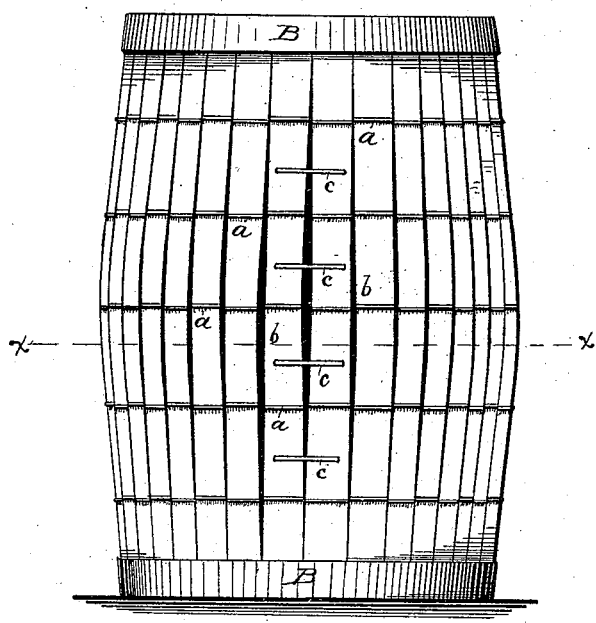
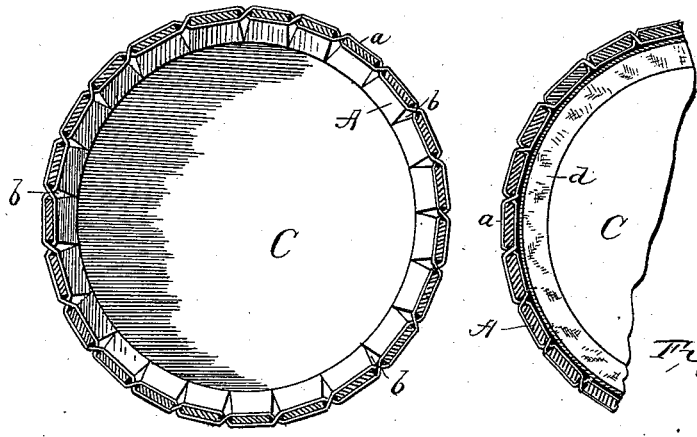
Witnesses
Wm. Rosenbaum
F. H. Schott
Inventor
Isaac A. Kerr
By his Attorney W. Burris

UNITED STATES PATENT OFFICE.

ISAAC A. KERR, OF MUSCATINE, IOWA.

VENTILATED BARREL.

SPECIFICATION forming part of Letters Patent No. 354,706, dated December 21, 1886.

Application filed September 15, 1886. Serial No. 213,550. (No model.)

*To all whom it may concern:*

Be it known that I, ISAAC A. KERR, a citizen of the United States of America, residing at Muscatine, in the county of Muscatine and State of Iowa, have invented certain new and useful Improvements in Ventilated Barrels, Cases, and other Ventilated Vessels, of which the following is a specification, reference being had therein to the accompanying drawings.

My invention relates to improvements in the construction of ventilated barrels, cases, or other vessels adapted for packing fruits, meats, vegetables, &c.; and the invention consists of a bulged barrel or other bulged vessel the sides of which are constructed of straight parallel-edged staves or slats woven together by wires and convexed longitudinally to form the bulge of the vessel. The staves or slats, by wires woven around them, are secured together in the convexed position, and are held apart from each other, except at and near their ends, allowing between the slats ventilating-spaces gradually increased from the ends to the central portion of the vessel.

This ventilating-barrel may be constructed with an air-tight head, or with a ventilated head, all as hereinafter fully set forth and claimed.

In the drawings, Figure 1 is a side elevation of my improved ventilating-barrel. Fig. 2 is a cross-section on line $x\ x$ of Fig. 1. Fig. 3 is a cross-section of a portion of a ventilated barrel having inner textile lining.

I have found by long experience that fruits and vegetables keep well when packed in barrels having air-tight heads, and having side ventilating-openings enlarged from the ends to middle of the barrels, allowing free central circulation of air through the fruit and vegetables, as hereinafter more fully explained.

It is evident that to construct a barrel of straight parallel-edged staves or slats having between them openings enlarged from their ends to their middle, the slats must be bent and secured in place in relation to each other while in the convexed position.

The present invention does not include nor depend upon any particular means or methods of bending and weaving together these slats. I find, however, that it will be very difficult and tedious to make such barrels by hand; but they may be made with great facility by a suitable machine such as I have constructed for the purpose, and for which I expect soon to obtain a patent. By means of such a machine the slats A may be bent and held in the required convex shape while they are woven together by the wires $a$, which are linked around the slats, as shown. These slats may be cut the required length and width of logs, or of the waste of wood-working mills or factories, and the ends of the slats may be chined, crozed, and trimmed by a suitable combined tool attached to the machine, which bends and weaves them together, or by any other suitable devices, preparatory to receiving the heads C, which are secured in place by the end hoops, B, placed over the ends o the slats, as shown.

For packing fruit and vegetables I construct my improved barrel with air-tight heads; but for packing meats I may construct the barrels with ventilated heads.

Packed barrels are usually placed on end, and where the heads are ventilated the lowest and most impure portions of the air are admitted into, but do not readily pass out of, the barrel. This damp impure air remaining facilitates the generation of gases in the lower portion of the barrel, causing speedy decay of fruits and vegetables.

In my barrel, the heads being air-tight and the slats being joined closely together at and for some inches from their ends, and the side openings being enlarged from the ends to the middle, dry pure air is admitted and allowed free circulation in all directions through the central portion of the barrel, which free central circulation tends to draw the air from the ends and cause it to pass away, thus producing return circulation of air between the middle and the ends of the barrel and lessening the liability of the decay of the fruits and vegetables packed in the barrel.

This ventilated barrel may be used also in packing meal, cereals, seeds, and any other substance except liquids, by providing the barrel with a lining, $d$, made of bagging or other suitable material which is pervious to air and adapted to allow free circulation of air through the openings between the slats. This lining is placed around the entire inner surfaces of the sides of the barrel and is secured in place by any suitable means. In constructing barrels for this purpose the slats are woven closer together than for fruits, as shown in Fig. 3 of the drawings. The slats are woven into webs of the required sizes to form the sides of the desired vessel, and in constructing the barrels the webs are bent so as to place the outer edges of the end slats contiguous to each other, and these end slats are then secured by means of the ties $c$, the ends of which are bent and inserted through the slats, as shown. These ties may be made long enough for their ends to be extended over and to hold against the inner edges of the end slats. The wires are woven around the slats in such manner as to hold their ends close together; but these ends may be readily sprung outward sufficiently to allow the heads of the barrel to be sprung into place. The hoops B being made with the usual draw are readily placed over the ends of the slats and are driven tightly down, holding the heads securely in place.

For the purposes of storage and transportation of the empty barrels they may be easily "knocked down" by removing the hoops and loosening one end of the ties, and the webs may be opened out and placed one upon another in position to occupy the smallest possible space. The hoops and the croze in the slats may be dispensed with, and the heads of the barrel may be secured in place by two runs of wires of required size woven around the slats in such position near their ends as to form upper and lower bearings for each head. This construction, not being essential to my invention, is not shown in the drawings.

It is evident that the degree of convexity of the slats may be less or more than that shown in the drawings, for the purpose of producing ventilating-openings of greater or less width, for the different purposes for which the barrels may be used.

I am aware that straight barrels constructed of parallel-edged slats woven together by wires, and having ventilating-openings of uniform width from end to end between the slats, are not new; and also that bulged barrels constructed of parallel-edged staves having ventilating-openings enlarged at the middle between the staves, which are secured by hoops, but not woven together by wires, are not new, and I do not claim such barrels; but

What I claim as new, and desire to secure by Letters Patent, is—

1. A bulged barrel having its sides constructed of straight parallel-edged staves or slats A, convexed longitudinally and secured by the woven wires $a$ in position to form between the slats the openings $b$, enlarged from the ends to the middle of the barrel, substantially as and for the purposes described.

2. A bulged barrel having its sides constructed of straight parallel-edged slats A, convexed longitudinally and secured by the wires $a$ in position to form between the slats the openings $b$, enlarged from their ends to the middle of the barrel, and having the airtight heads C secured in place, substantially as and for the purposes described.

3. The combination, with a bulged barrel having its sides constructed of straight parallel-edged staves or slats convexed longitudinally and secured by woven wires in position to form between the slats ventilating-openings enlarged from the ends to the middle of the barrel, of an inner pervious lining adapted to admit ventilation through the openings, substantially as and for the purposes described.

In testimony whereof I affix my signature in presence of two witnesses.

ISAAC A. KERR.

Witnesses:
H. D. NORTON,
FRANK M. GREEN.